United States Patent [19]

Koike

[11] Patent Number: 4,975,709

[45] Date of Patent: Dec. 4, 1990

[54] WAKE PLOTTER APPARATUS

[75] Inventor: Fuji Koike, Nagoya, Japan

[73] Assignee: Fuji-Royal Co., Ltd., Minami, Japan

[21] Appl. No.: 408,721

[22] Filed: Sep. 18, 1989

[30] Foreign Application Priority Data

Sep. 19, 1988 [JP] Japan .................................. 63-235472
Dec. 27, 1988 [JP] Japan .................................. 63-332553

[51] Int. Cl.⁵ .............................................. G01S 5/02
[52] U.S. Cl. ..................................... 342/417; 367/111;
367/907
[58] Field of Search ............... 342/177, 417; 364/449,
364/455, 41, 182, 179; 367/907.88, 111

[56] References Cited

U.S. PATENT DOCUMENTS

| 4,114,437 | 9/1978 | Krogmann | 364/450 |
| 4,590,569 | 5/1986 | Rogoff et al. | 364/452 |
| 4,623,966 | 11/1986 | O'Sullivan | 342/455 |
| 4,706,090 | 11/1987 | Hashiguchi et al. | 342/455 |
| 4,837,750 | 6/1989 | Saunders | 367/111 |

Primary Examiner—Theodore M. Blum
Attorney, Agent, or Firm—Darby & Darby

[57] ABSTRACT

A wake plotter apparatus capable of displaying the bearings of a vessel and a target point in which the vessel is intended to be returned is disclosed which includes a compass sensor, a speed sensor, a displaying device and a central processing unit.

6 Claims, 4 Drawing Sheets

WAKE PLOTTER APPARATUS

This invention relates to a wake plotter apparatus capable of displaying the bearings of a vessel or a boat which change every moment as the vessel runs and of making it easy for the vessel to return to a desired position.

There is known a device having a display device adapted to show the running direction of a vessel as a positional image on an azimuthal coordinate representing east, west, north and south directions. There is also known an apparatus composed of a navigation device, such as a Loran, Omega or NNSS radio instrument, for measuring the bearings of a vessel, and a display device displaying the positional image of the vessel on the basis of the measured results obtained by the navigation device.

When a fish detector on a boat finds fish, the boat should return to that point for fishing. In this case, when there are no marks such as rock or reef in the vicinity of the point, it is very difficult to bring the boat precisely back to the point. It is, therefore, a usual practice to explore fish repeatedly using the fish detector. Also, in a case a man falls overboard, it is difficult to bring the boat back to the falling point when the visibility is poor.

Thus, there is a great demand for a wake plotter apparatus which permits the return of the boat to a desired target point.

In accordance with the present invention there is provided a wake plotter apparatus for a vessel, comprising:

a compass sensor for detecting the bearings of the vessel;

means for generating an output according to a running speed of the vessel;

basic position generating means for setting the present position of the vessel as a basic position;

a position setting switch for setting the position of the vessel as a point position at the time the position setting switch is inputted;

a display device for displaying a wake image in which a positional image of the vessel indicative of the moving direction thereof is displayed on an azimuthal coordinate; and a central processing unit operable for (a) setting the azimuth of the positional image of the vessel by detecting a difference angle $\theta$ between the actual moving direction of the vessel and a predetermined basic azimuth from the information of the bearings detected by said compass sensor, (b) computing the position (X, Y) of the positional image of the vessel on the azimuthal coordinate on the basis of the following operational expressions:

$$X = C \int_0^t v \cdot \sin\theta \, dt + X_o$$

$$Y = C \int_0^t v \cdot \cos\theta \, dt + Y_o$$

wherein $\theta$ is as defined above, v represents the running speed of the vessel indicated by said running speed generating means, t represents a period of time from the start of reading and C is a constant, thereby to continually show the moving positional image of the vessel on the azimuthal coordinate, and (c) instructing said display device to continuously show the position (X, Y) at the time said point setting switch is inputted on the azimuthal coordinate as a point image.

The azimuthal coordinate on which the wake image is to be displayed does not always require a specific coordinate but this term is used merely to represent a positional relationship relative to a basic azimuth. Namely, this term is intended to refer to a coordinate defined by a central processing unit (CPU) so that the positional image of the vessel may be displayed at an appropriate location of the display screen correspondingly to the actual position of the vessel.

As the vessel running speed generating means, there may be mentioned a speed sensor or a ten-key switch capable of inputting approximate speed data.

The simplest form of the basic position generating means is a basic position setting switch which sets the present position as a zero position at the time the switch is inputted. In this case, $X_0=0$, $Y_0=0$ and the position (X, Y) of the positional image of the vessel on the azimuthal coordinate is a position relative to that at the time the setting switch was inputted. When the position (X, Y) is such a relative position, the data thereof is of no use once the power switch is turned off since the position (X, Y) is variable.

Thus, as an alternative embodiment for the basic position generating means, there may be used one which includes a navigation system for detecting the absolute position of the vessel and for generating a detection output, and a drive command device for instructing said navigation system to start operation, so that the position (X, Y) of the positional image of the vessel on the azimuthal coordinate is an absolute position. The navigation system may be a conventional radio instrument such as a Loran, Omega or NNSS instrument while the command device may be a switch adapted to generate a read-out instruction signal each time the switch is made ON, a timer adapted to generate a read-out instruction signal each time a predetermined period of time has passed, or a device adapted to generate a read-out instruction signal each time the vessel has displaced through a predetermined distance.

As the basic position generating means there may also be used one which includes a basic numeral inputting device adapted to manually inputting the absolute position of the vessel, so that the position (X, Y) of the positional image of the vessel on the azimuthal coordinate is an absolute position.

The position X can be calculated from the present speed v and a period of time (dt) from the present till the next read-out time. Namely, the position X can be calculated by integrating an apart distance $dt \cdot v \cdot \sin\theta$ per unit time (dt) where $\theta$ is an angle difference between the actual moving direction of the vessel and a target azimuth. In this case, when the data read-out is carried out at a predetermined interval, the distance X can be expressed by the following formula since dt is constant:

$$X = Cdt \sum_{n=1}^{n=N} V_n \cdot \sin\theta_n + X_o$$

where C is a constant, n is the number of the counts for reading the azimuth and speed and N is the number of the count at the present point in time. Since dt is constant, the above formula may be rewritten as follows:

$$X = c \sum_{n=1}^{n=N} V_n \cdot \sin \theta_n + X_o$$

where c is a constant.

The speed v is regarded as being constant when approximated by an input from a ten-key switch. Thus, the above formula can also be expressed as follows:

$$X = c' \sum_{n=1}^{n=N} \sin \theta_n + X_o$$

where c' is a constant

Similarly, the position Y can be expressed as follows:

$$Y = Cdt \sum_{n=1}^{n=N} V_n \cdot \cos \theta_n + Y_o$$

$$Y = c \sum_{n=1}^{n=N} V_n \cdot \cos \theta_n + Y_o$$

$$Y = c' \sum_{n=1}^{n=N} \cos \theta_n + Y_o$$

where C, c and c' are constant.

In the above construction, the central processing unit performs computation using the information from the compass sensor and instructs the display device to show the point image and the positional image of the vessel.

The positional image of the vessel changes as the vessel moves according to the set condition for the computation of the position (X, Y) on the coordinate, while the point image is kept at a fixed position on the coordinate. Thus, by steering the vessel so as to make the positional image coincident with the point image, the vessel can be returned to the target point.

The present invention will now be described in more detail below with reference to the accompanying drawings, in which.

Figure 1:
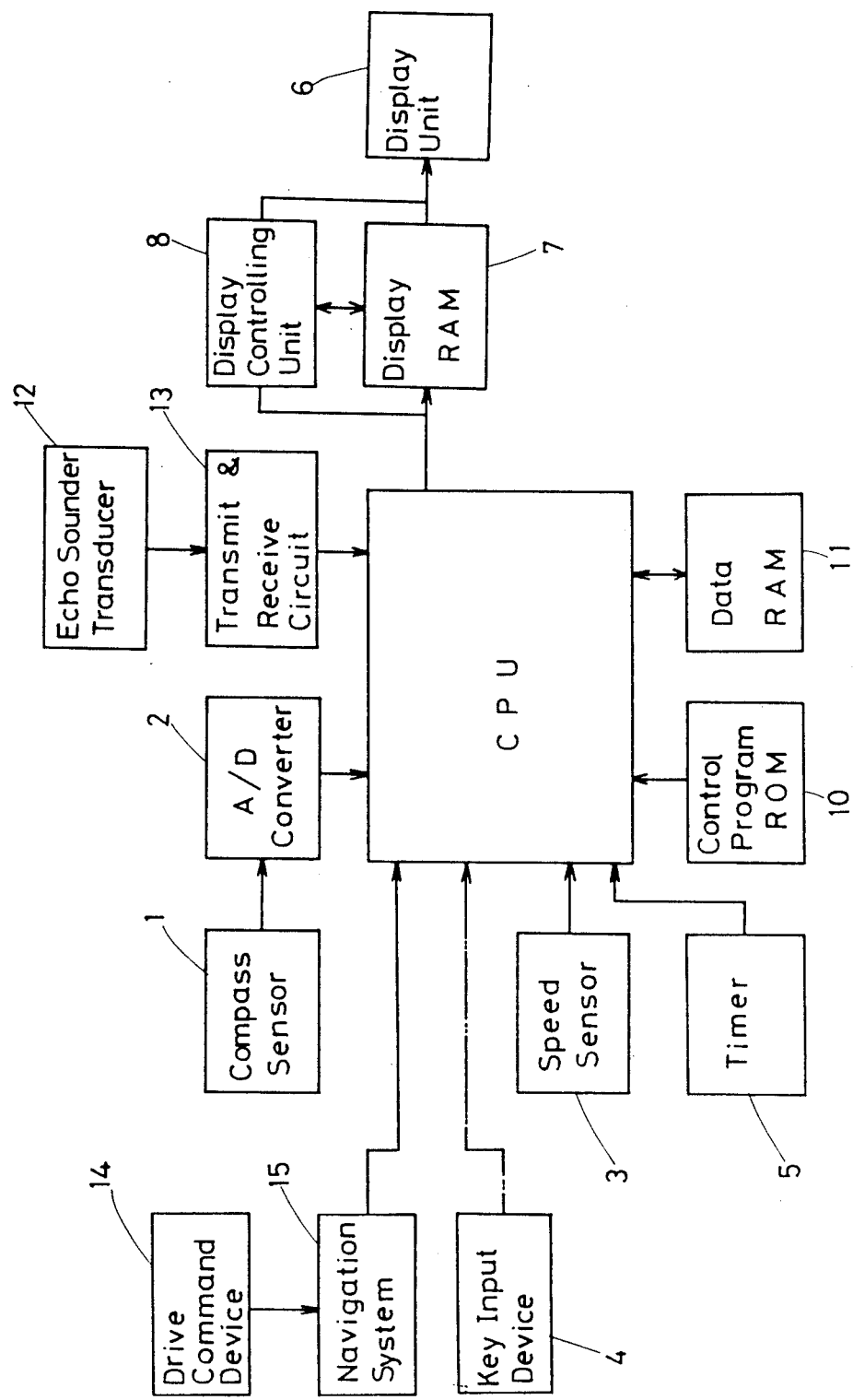
FIG. 1 is a block diagram showing one embodiment according to the present invention.

Referring now to FIG. 1, the reference numeral 1 denotes a compass sensor which is an input device coupled to a central processing unit CPU through an A/D converter capable of converting an analog signal from the compass sensor 1 to a digital signal to be fed to CPU. Connected also to CPU are a speed sensor 3, a key input device 4 and a timer 5.

Further, a navigation system 15 such as a Loran, Omega or NNSS radio instrument is connected to CPU. Designated as 14 is a drive command device adapted to cause the navigation system 15 to start read-out operation. As the drive command device 14, a switch adapted to generate a drive instruction each time the switch is made ON, a timer adapted to generate a read-out instruction signal in a predetermined interval or a control device adapted to generate an instruction signal each time the vessel displaces through a predetermined distance may be used.

The purpose for causing the navigation system 15 to perform read-out operation with a predetermined interval by means of a timer or the like device is to minimize an error which tends to be accumulated with the use of information from the compass sensor 1 and speed sensor 3 during a long period of the steering of the vessel. Thus, absolute positional information ($X_0$, $Y_0$) is obtained with a predetermined interval and the positional information is computed on the basis of the freshly obtained information so as to minimize an error automatically without resorting to an input from a switch.

As an output device, a display device (display unit) 6 is coupled to CPU through a display RAM 7 and a display controlling unit 8. A control program ROM 10 and a data RAM 11 are also connected to CPU. When a fish detector is to be used, an echo sounder transducer 12 is connected to CPU through a transducer and receive circuit 13. An automatic steering device (not shown) may also be connected to CPU so as to enable automatic steering on the basis of information from the compass sensor 1.

The compass sensor 1 may be, for example, of a type which has a magnet rotatable by earth's magnetism and a hall device adapted to detect the rotational angle of the magnet in terms of variation of the magnetic flux. A flux gate sensor or a gyro sensor may also be used as the compass sensor 1. Since the compass sensor 1 is so arranged that its reference direction (generally marked by an arrow on the top surface of thereof) indicates the N-pole of the earth's magnetism, it is important that the compass sensor 1 should be mounted on a vessel so that the reference direction is parallel to the ship's longitudinal axis (bow direction).

The compass sensor 1 generates a sine or cosine output corresponding to the bearings of the vessel. The output is converted to a digital signal in the A/D converter 2 and is fed to CPU where the signal is read out in accordance with a program stored therein, thereby to determine the bearings of the vessel.

Figure 2:
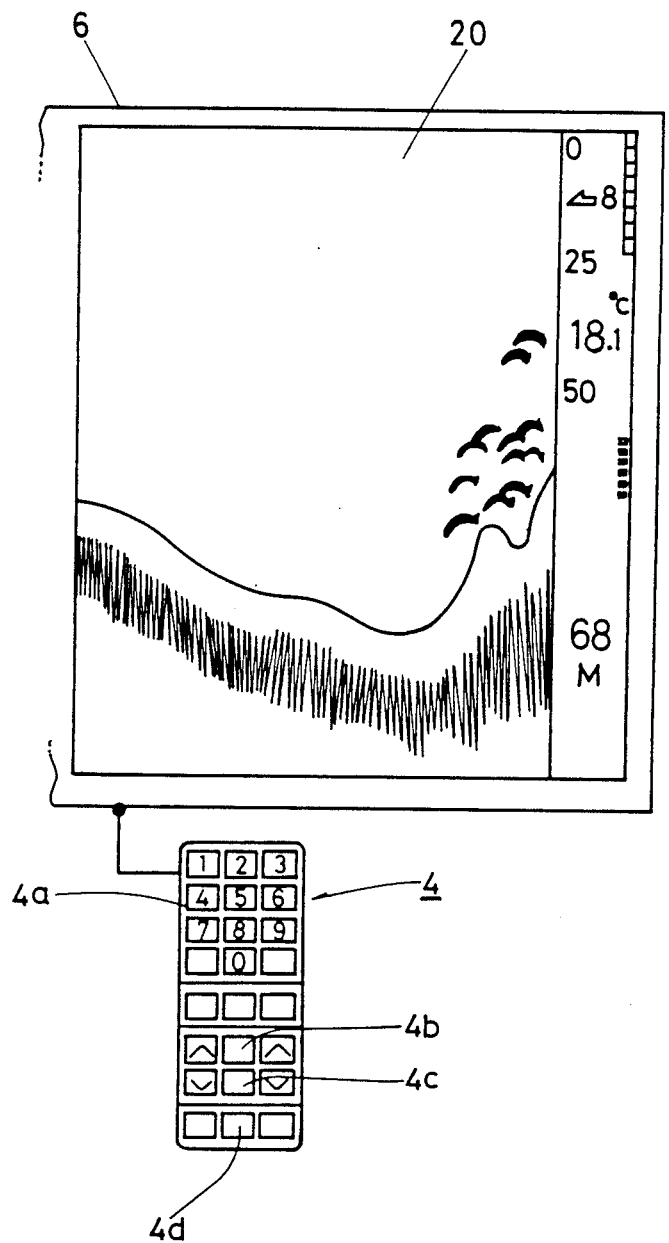
FIG. 2 is a front view showing a display device which is displaying a fish detecting image.

The key input device 4 includes a point setting switch 4b, a ten-key 4a, an azimuth setting switch 4c and a selector switch 4d, as shown in FIG. 2 which illustrates a screen of the display device 6 where fish detecting image 20 according to the information from the transducer 12 is displayed. The image 20 includes depth of the sea bottom, position of fish and the change thereof with time, namely the change caused according to the displacement of the vessel.

Figure 3:
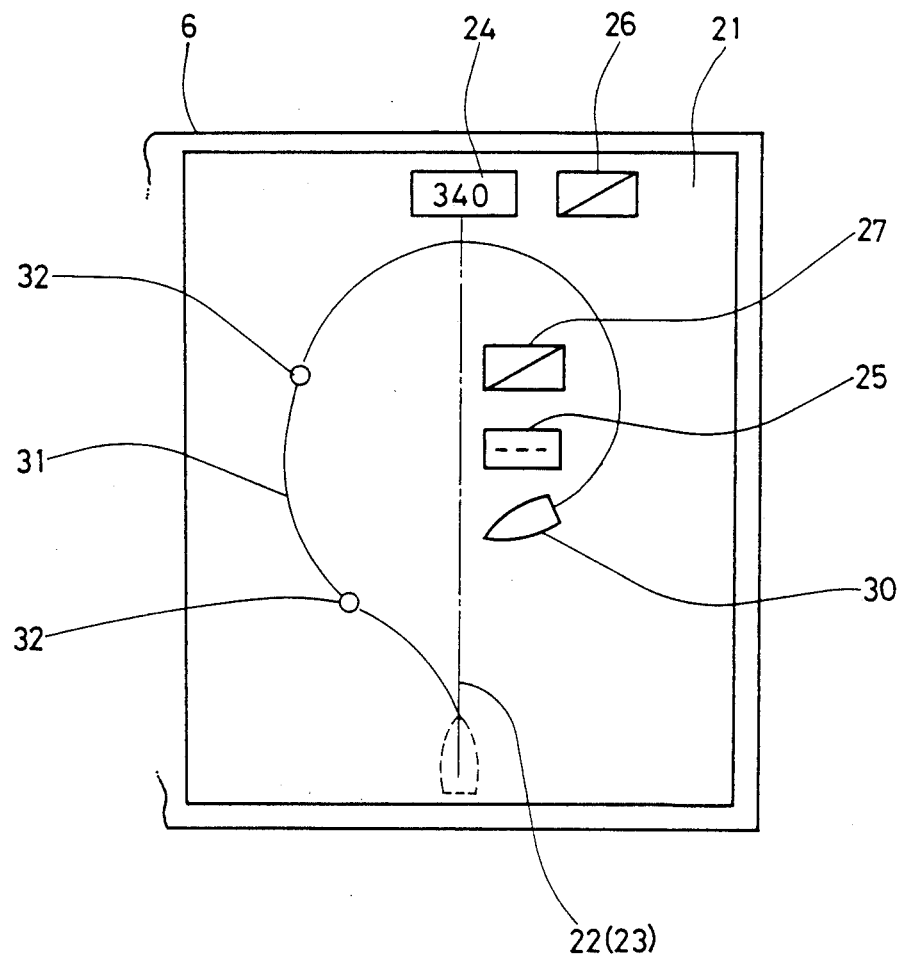
FIG. 3 is a view similar to FIG. 2 showing a wake image.

The fish detecting image 20 on the screen can be changed to a wake image 21 as shown in FIG. 3 by the operation of the selector switch 4d of the input device 4. The fish detecting image 20 or the wake image 21 may be readily displayed on the screen because CPU is always proceeding with the fish detecting and wake plotting operations even though one of them is not actually displayed on the screen. Thus, as described hereinafter, when fish is found on the fish detecting image 20 and when the point setting switch 4b of the key input device 4 is pushed, the positional image of the fish can be seen on the wake image 21.

In the wake image 21, there are displayed an absolute azimuth coordinate 22 having a longitudinal (or both longitudinal and lateral) coordinate axis 23, and a positional image 30 of the vessel showing the position and displacing direction of the vessel on the coordinate 22. On the upper portion of the axis 23, there is provided a set azimuth indexing window 24 where the target azimuth is indicated in a digital mode in the range of 0-359 degrees. Thus, the steersman can steer the vessel so as to direct the vessel toward the target point while checking the relationship between the absolute azimuth coordinate 22 and the positional image 30 of the vessel together with the indexing window 24. The target azimuth in the indexing window 24 can be obtained by calculation from the latitude and the longitude of the target point shown in a target point indicating window 26 and those of the present point and changes as the vessel moves.

In lieu of the above coordinate axis 23, a coordinate matrix composed of latitudes and longitudes may be used as the absolute azimuth coordinate 22. Further, even if the reference lines such as the coordinate axis 23 are not indicated in the image, it can be safely said that an absolute azimuth coordinate 22 is defined in the wake image 21 as long as an absolute position can be specified in the image. In this case, as shown in FIG. 3, a present position indicating window 27 showing the latitude and longitude of the present position of the vessel may be suitably provided in the vicinity of the positional image 30 of the vessel so as to enable the confirmation of the position of the vessel. It is also possible to provide an azimuth indexing window 25 showing the present azimuth of the vessel in a lower portion of the indicating window 27.

Next, the operation of the positional image 30 of the vessel according to the present invention will be explained. when the target point is set (explanation is omitted here), the positional image 30 of the vessel is shown on the coordinate axis with its bow end orienting upward. As the vessel is steered, the positional image 30 changes moment by moment while a wake line 31 is drawn. The change of the positional image of the vessel on the absolute azimuth coordinate 22 is computed by CPU.

That is, the drive command device 14 causes the navigation system 15 to operate so that the absolute position information $(X_0, Y_0)$ is read. The read-out value is indicated in the position indicating window 27. On the basis of the input value from the drive command device 14, CPU calculates the angular difference between the target azimuth and the present azimuth on the basis of the information from the compass sensor 1. Then, on the basis of the clock pulse from the timer 5, CPU performs computation, in every time the period dt has passed, from the input of the speed v from the speed sensor 3 and a proportional constant C indicating contraction rate between the actual distance and the length on the screen as follows:

$$dX_n = C \times v_n \times dt \times \sin\theta_n \quad (1)$$

$$dY_n = C \times v_n \times dt \times \cos\theta_n \quad (2)$$

where n is a read-out count number. On the basis of the thus calculated values, the absolute coordinate position (X, Y) of the positional image 30 of the vessel is displaced on the absolute azimuth coordinate 22 each time a predetermined period of time dt has passed.

Figure 4:
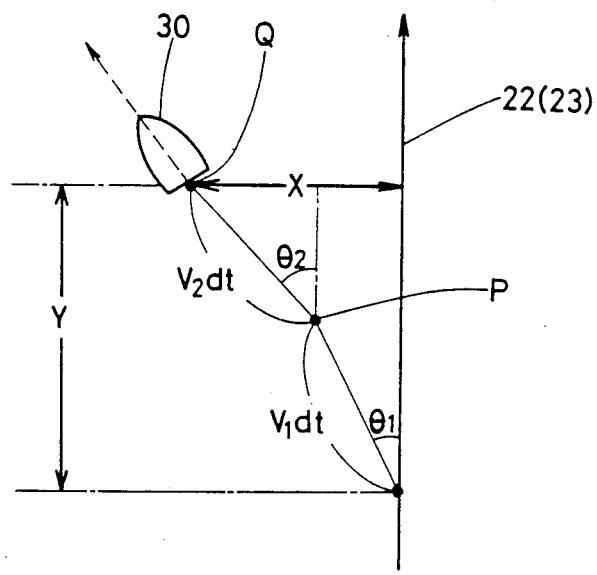
FIG. 4 is an explanatory view showing a displacement control means for positional image of the vessel.

In this manner, the positional image 30 of a point P is plotted on the wake image 21 when n=1 and that of a point Q is plotted when n=2 as shown in FIG. 4, thereby to show the wake of the vessel by the line 31. The plots in FIG. 4 are schematic for better understanding. Actually, the time period dt is very short so that the positional image 30 moves smoothly and the wake line 31 becomes smooth.

From the above equations, the absolute azimuth position (X, Y) may be expressed as follows:

$$X = C \int_0^t v \cdot \sin\theta \, dt + X_0$$

$$Y = C \int_0^t v \cdot \cos\theta \, dt + Y_0$$

where t is a time period from the start of the read-out.

Since each data is inputted and is used for calculation every dt time as a digital value, the absolute azimuth position (X, Y) may be calculated by integrating the displacement distance per each time (dt) shown in equations (1) and (2) as follows:

$$X = Cdt \sum_{n=1}^{n=N} v_n \cdot \sin\theta_n + X_0$$

$$Y = Cdt \sum_{n=1}^{n=N} v_n \cdot \cos\theta_n + Y_0$$

where N is the count value at the present point in time, while $v_n \cdot \sin\theta$ and $v_n \cdot \cos\theta + Y_0$ are the numbers obtained in the n-th time count. Since dt is constant, the above equations can be shown as follows:

$$X = c \sum_{n=1}^{n=N} v_n \cdot \sin\theta_n + X_0$$

$$Y = c \sum_{n=1}^{n=N} v_n \cdot \cos\theta_n + Y_0$$

where c is a constant.

Further, the vessel is run in most cases at a constant speed. In this case the speed v can be regarded as being constant. In the case of a vessel which is not provided with a speed sensor 3, an approximate speed may be inputted from a ten-key 4a of the input device. In this case, too, the speed v can be regarded as being constant. Thus, the above equations can be shown as follows:

$$X = c' \int_0^t v \cdot \sin\theta \, dt + X_0$$

$$Y = c' \int_0^t v \cdot \cos\theta \, dt + Y_0$$

or $$X = c' \sum_{n=1}^{n=N} \sin\theta_n + X_0$$

$$Y = c' \sum_{n=1}^{n=N} \cos\theta_n + Y_0$$

where c' is a constant. That is, the present position of the vessel can be approximately shown on the absolute azimuth coordinate 22 using only the information from the compass sensor 1.

The error information (angular difference $\theta$) in the target azimuth and the present azimuth may be utilized as control information for an automatic steering device. In this case, the automatic steering device is connected to CPU through an I/O port, an output buffer, a connector and a cable. Other than the automatic steering device, various instruments such as a printer can be connected to CPU for the effective utilization of the above-mentioned various information.

Thus, on the absolute azimuth coordinate 22 in the wake image 21 there is drawn the wake line 31 composed of dense segments and used for various purposes. Since the wake line 31 is based on the absolute position, the data obtained are effectively stored for the purpose of returning the vessel back to a desired position.

With a navigation system which is able to obtain absolute bearings, a long period of time is required for computing the bearings. For instance, a Rolan radio instrument and a satellite navigation system require several tens seconds and several tens minutes. As a result, a precise wake line cannot be drawn since the number of the plot should be limited. In contrast, since, in the apparatus according to the present invention, the navigation system is utilized only for determining the basic position and since the bearings are computed on the basis of the basic position, a precise wake line can be swiftly obtained.

As described above, with the positional information from the compass sensor 1 and the speed sensor 3, an error tends to be accumulated during a long period of steering. Thus, the navigation system 15 is occasionally driven by the drive command device 14 to obtain correct information based on which the wake line 31 is drawn. At the same time, the target position is again calculated and is shown anew in the set azimuth indexing window 24.

In place of the navigation system 15 and the drive command device 14, a ten-key (the ten-key 4a may be used therefor) can be used as a base numeral input device 4 for manually inputting the absolute position of the vessel. On the basis of this positional information, a wake line can be drawn. In a case where such a manual inputting means is used, the absolute position may be read from a chart and inputted when the vessel is at anchor.

The setting of a point position will be described next. The fish detecting image 20 is displayed on the display device 6. When a shoal of fish is found, the point setting switch 4b is pushed. By this, the coordinate position (X, Y) of the present position of the vessel is set as a point position. When the fish detecting image 20 is changed to the wake image 21 by the operation of the selector switch 4d, the point position is shown in the image 21 as a point image 32 as shown in FIG. 3.

The coordinate data of the point image 32 is stored in the data RAM 11 and remains indicated in the image 21. If another fishing point is found, the switch 4b is pushed again. By this, the new data is stored in RAM 11 and both of the new and previous point images are shown on the wake line 31.

When it is desired to return the vessel to one of the fishing points, the vessel is steered while watching the displayed wake image 21, in such a manner that the positional image 30 of the vessel become coincident with the desired point image 32. An alarm mechanism is suitably provided to signalize an alarm when the positional image 30 coincides with the point image 32. It is preferable to provide a zoom mechanism so that a desired portion of the image can be enlarged for better recognition of the position of the positional image 30 relative to the point image 32.

Thus, according to the present invention, the positional image 30 of the vessel can be continually confirmed in the wake image 21. When a specific point is found during the steering of the vessel, that point can be marked on the wake image 31 as a point image 32. As a consequence, it is very easy to return the vessel to that position. Further, since the point position is recognized as an absolute position, it is easy to return later on the vessel to this point if the point data is stored. The marking of the point image 32 is utilized for various purposes other than for fishing. For example, when a person falls overboard, the apparatus of the present invention is effective to determine the falling point and to bring the vessel back to the falling point for saving the person.

Next, an alternative embodiment in which the positional image of the vessel is a relative position will be explained. In this embodiment, the navigation system 15 as used in the foregoing embodiments is not needed, since the azimuth setting switch 4c is utilized as a basic position setting switch. When the switch 4c is inputted, the present position is set as a zero position ($X_0=0$, $Y_0=0$). In this case, the target position is set as a relative position to the zero position. Therefore, it is not possible to input the target position (absolute position) using a chart. Thus, while directing the vessel toward the target position, the azimuth setting switch 4c is inputted. By this, the direction of the vessel which is the direction toward the target position is indicated in the set azimuth indexing window 24. This set azimuth remains unchanged until the switch 4c is again inputted. A wake line is then drawn with the thus set azimuth serving as a basic position. The position (X, Y) of the vessel at the time the point setting switch 4b is pushed is marked as a point image 32 as shown in FIG. 3.

In the above embodiments, it is not important that the wake line 31 should be drawn since the wake line 31 merely shows a hysteresis line. The setting of the target azimuth in the wake image 21 is not always necessary. The azimuth coordinate 22 can be an absolute coordinate representing the east, west, north and south directions.

With the apparatus according to the present invention, the positional image 30 of the vessel is indicated on the azimuthal coordinate 22 of the wake image 21 displayed by the display device 6. As the vessel moves, the positional image 30 displaces on the azimuthal coordinate 22. At the same time, the target position is marked as the point image 32. Thus, even when there are no marks around the vessel, the vessel can easily return to a desired target point. The apparatus of the present invention may be particularly effective in fishing or in saving a life.

What is claimed is:

1. A wake plotter apparatus for a vessel, comprising:
   a compass sensor for detecting the bearings of the vessel;
   means for generating an output corresponding to a running speed of the vessel;
   basic position generating means for setting the present position of the vessel as a basic position;
   a position setting switch for setting the position of the vessel as a point position at the time the position setting switch is inputted;
   a display device for displaying a wake image in which a positional image of the vessel indicative of the moving direction thereof is displayed on an azimuthal coordinate; and
   a central processing unit operable for (a) setting the azimuth of the positional image of the vessel by detecting a difference angle $\theta$ between the actual moving direction of the vessel and a predetermined basic azimuth from the information of the bearings detected by said compass sensor, (b) computing the position (X, Y) of the positional image of the vessel on the azimuthal coordinate on the basis of the following operational expressions:

$$X = C \int_0^t v \cdot \sin\theta \, dt + X_o$$

$$Y = C \int_0^t v \cdot \cos\theta \, dt + Y_o$$

wherein $\theta$ is as defined above, v represents the running speed of the vessel indicated by said running speed generating means, t represents a period of time from the start of reading and C is a constant, thereby to continually show the moving positional image of the vessel on the azimuthal coordinate, and (c) instructing said display device to continuously show the position (X, Y) at the time said point setting switch is inputted on the azimuthal coordinate as a point image.

2. A wake plotter apparatus as claimed in claim 1, wherein said basic position generating means includes a basic position setting switch which sets the present position at the time said basic position setting switch is inputted as a zero position ($X_0=0$, $Y_0=0$), so that the position (X, Y) of the positional image of the vessel on the azimuthal coordinate is a relative position.

3. A wake plotter apparatus as claimed in claim 1, wherein said basic position generating means includes a navigation system for detecting the absolute position of the vessel and for generating a detection output, and a drive command device for instructing said navigation system to start operation, so that the position (X, Y) of the positional image of the vessel on the azimuthal coordinate is an absolute position.

4. A wake plotter apparatus as claimed in claim 1, wherein said basic position generating means includes a basic numeral inputting device adapted to manually inputting the absolute position of the vessel, so that the position (X, Y) of the positional image of the vessel on the azimuthal coordinate is an absolute position.

5. A wake plotter apparatus as in claim 1, further comprising:
   means for displaying a fish detecting image indicative of a depth of a sea bottom and position of fish with respect to displacement of the vessel over time; and
   means for representing said fish detecting image as a portion of said wake image.

6. A wake plotter apparatus as in claim 1, wherein said wake image shows said positional image of the vessel and said position (X,Y) at different locations simultaneously.

* * * * *